United States Patent [19]
Szigeti

[11] Patent Number: 6,158,638
[45] Date of Patent: Dec. 12, 2000

[54] VEHICLE ROOF RACK

[76] Inventor: Josef Szigeti, 502 Avenida Lorenzo, Newport Beach, Calif. 92660

[21] Appl. No.: 09/425,562

[22] Filed: Oct. 22, 1999

[51] Int. Cl.$^7$ ..................................................... B60R 9/042
[52] U.S. Cl. .......................... 224/310; 224/315; 224/326; 414/462
[58] Field of Search ..................................... 224/310, 315, 224/321, 325, 326, 548, 554; 414/462

[56] References Cited

U.S. PATENT DOCUMENTS

| | | |
|---|---|---|
| 3,963,136 | 6/1976 | Spanke . |
| 4,003,485 | 1/1977 | Edgerton . |
| 4,236,860 | 12/1980 | Gottlieb . |
| 4,240,571 | 12/1980 | Ernst . |
| 4,260,314 | 4/1981 | Golze ........................................ 414/462 |
| 4,291,823 | 9/1981 | Freeman et al. . |
| 4,339,223 | 7/1982 | Golze . |
| 4,350,471 | 9/1982 | Lehmann . |
| 4,446,998 | 5/1984 | Taig . |
| 4,826,387 | 5/1989 | Audet . |
| 5,360,150 | 11/1994 | Praz . |
| 5,535,929 | 7/1996 | Neill .......................................... 224/310 |
| 5,544,796 | 8/1996 | Dubach ..................................... 224/310 |
| 5,673,831 | 10/1997 | Spratt ........................................ 224/310 |
| 6,015,074 | 1/2000 | Snavely et al. ............................ 224/310 |

*Primary Examiner*—Stephen K. Cronin
*Attorney, Agent, or Firm*—Roth & Goldman

[57] ABSTRACT

A vehicle roof rack including spaced stationary supports carries cargo which may be loaded or unloaded from either side of the vehicle merely by unlocking a single lock and longitudinally sliding upper elongated cargo supports respectively connected to each of the stationary supports laterally toward and away from a desired side of the vehicle so that the elongated cargo support can also be moved and pivoted in parallel vertical planes to load or unload cargo from the chosen side of the vehicle. An single ink and two guide saddles connect and guide each cargo support relative to the associated stationary support.

11 Claims, 4 Drawing Sheets

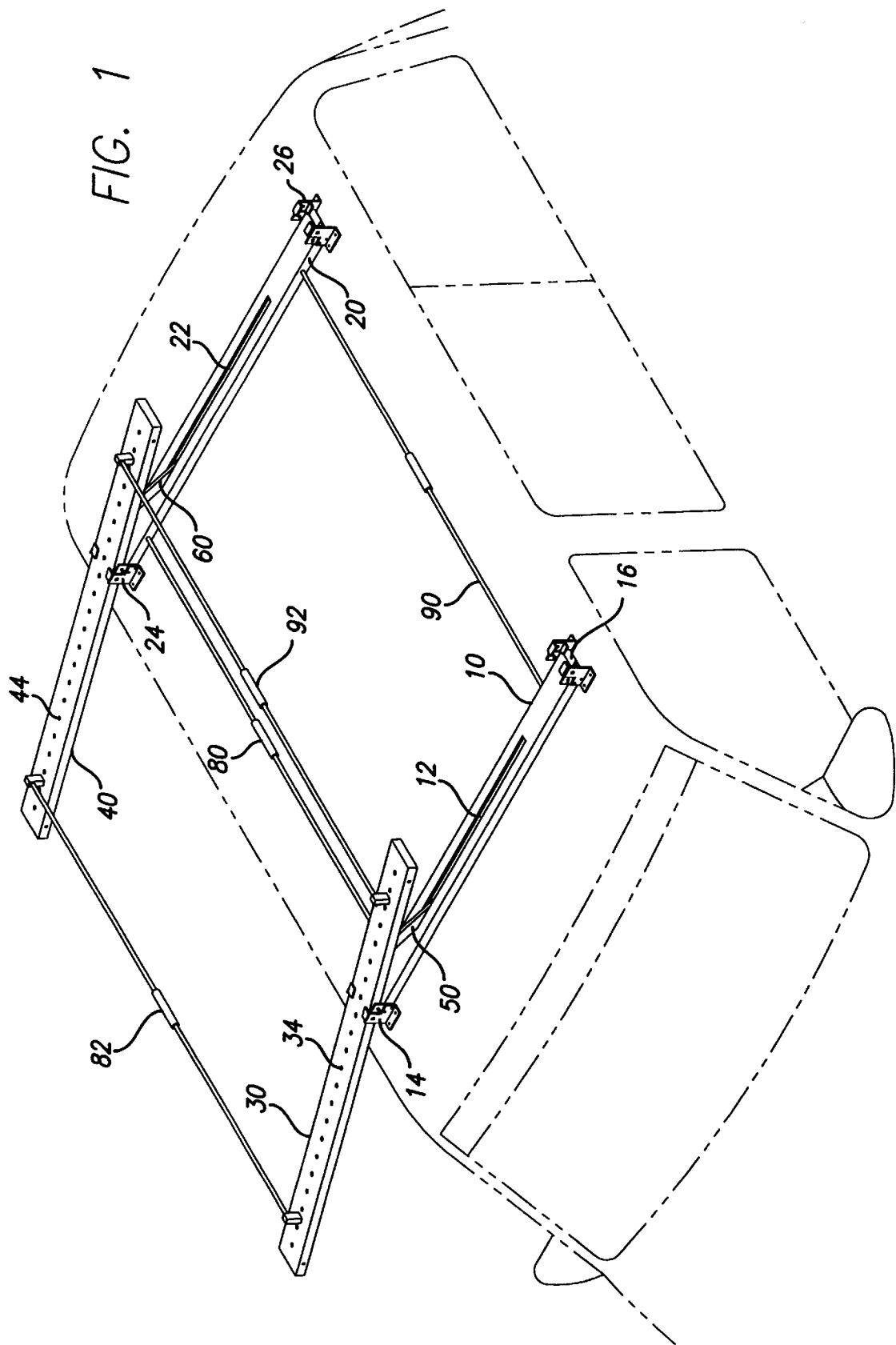

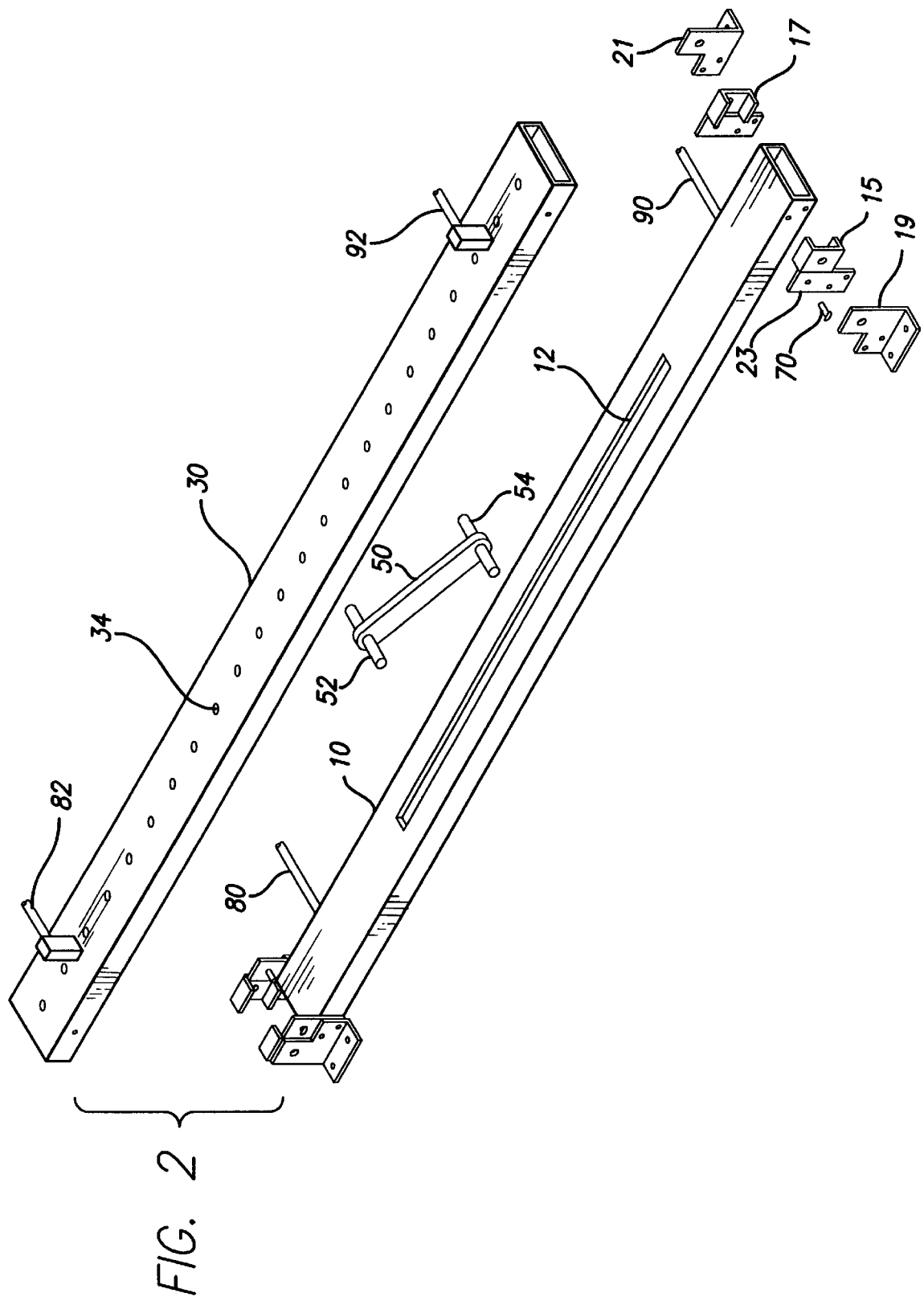

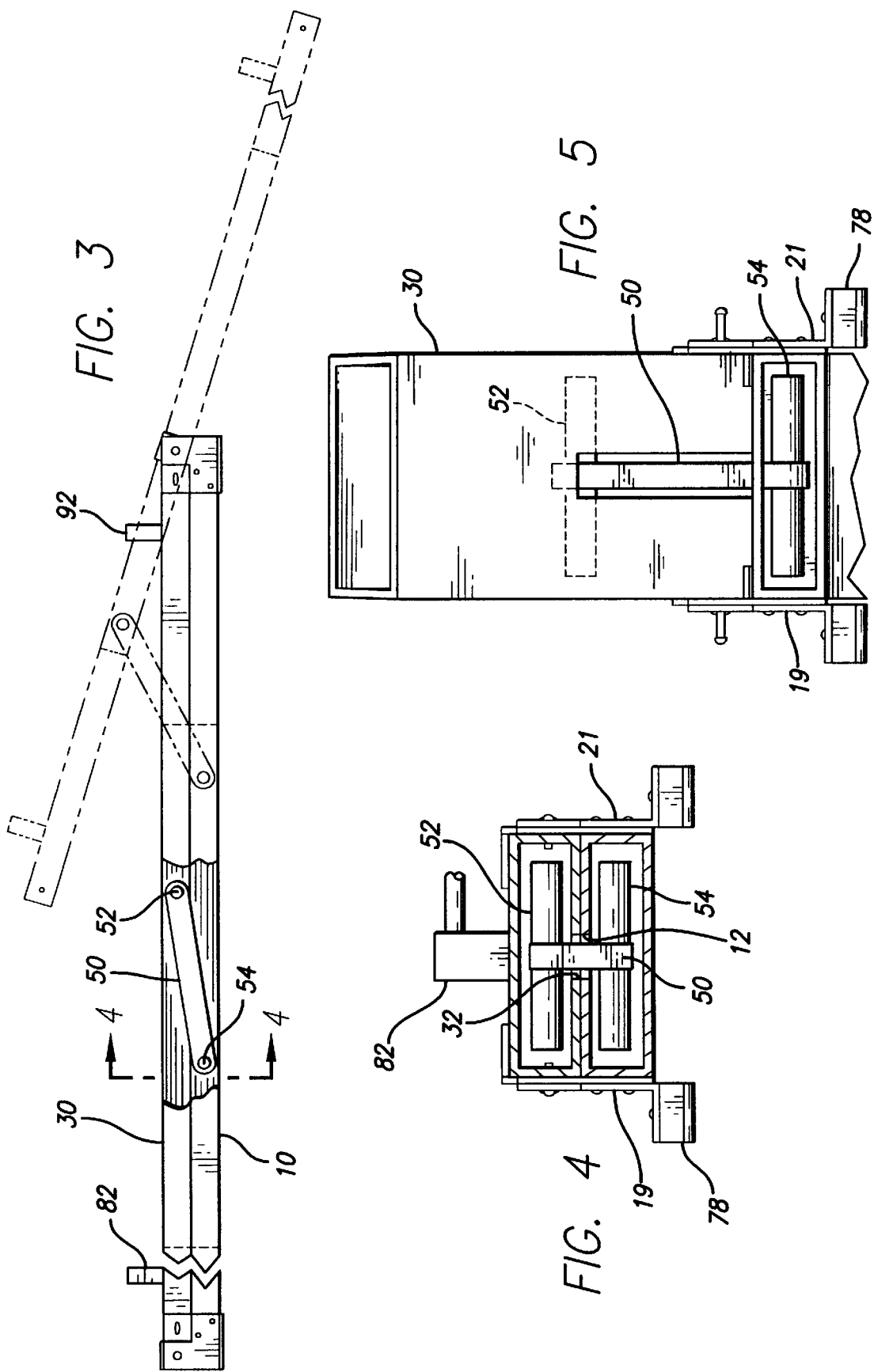

VEHICLE ROOF RACK

CROSS REFERENCE TO RELATED APPLICATIONS, IF ANY

None

BACKGROUND OF THE INVENTION AND PRIOR ART

1. Field of the Invention

The present invention relates in general to vehicle roof racks and, more particularly, to a vehicle roof rack of strong and simple construction with a minimal number of parts including a pair of elongated cargo supports which can be easily moved from a cargo transportation position atop the vehicle to a cargo loading and unloading position at either side of the vehicle.

2. Prior Art

The prior art is replete with various vehicle roof racks for loading boats, wheel chairs, ladders, luggage and other cargo atop a vehicle. Some of these are movable away from the vehicle roof for loading from a side of the vehicle or from the rear of the vehicle and, in general, most such racks involve complex mechanisms and structures which can be easily bent or damaged during normal use rendering the vehicle roof rack inoperable or at least difficult to operate.

OBJECT OF THE INVENTION

It is accordingly an object of the present invention to provide a vehicle roof rack of strong and simple construction which is capable of alternate sideways movement for loading and unloading cargo from either side of the vehicle.

SUMMARY OF THE INVENTION

The present invention accordingly provides vehicle roof rack for loading and unloading cargo to be transported atop a vehicle from either side of the vehicle comprising:

a) a pair of elongated stationary supports mountable atop a vehicle in spaced generally parallel relationship to each other, each stationary support having an elongated slot in an upper surface thereof;

b) a pair of elongated moveable cargo supports respectively mountable on said stationary supports, said cargo supports being longitudinally and pivotally moveable with respect to said stationary supports in vertical planes containing said stationary supports, said cargo supports each having an elongated slot in a lower surface thereof;

c) each stationary support having a cargo support guide saddle pivotally affixed thereto proximate each end thereof, said guide saddles being sized to slideably receive and restrain an associated cargo support; and d) each stationary support and associated cargo support having a connecting link extending through each of the associated ones of said slots, said links having upper and lower retainers proximate the ends of said links, said retainers being respectively engageable with associated ones of said cargo supports and said stationary supports to prevent said links from becoming disengaged from said slots, said links and said slots having length to permit said cargo supports to slide laterally with respect to said stationary supports so that said cargo supports may be longitudinally moved through said guide saddles and pivoted in vertical planes to tip said cargo supports toward either side of a vehicle.

BRIEF DESCRIPTION OF THE DRAWINGS

FIG. 1 is a perspective view of the roof rack positioned atop a vehicle shown in phantom.

FIG. 2 is an exploded view of the forward portion of the roof rack of FIG. 1.

FIG. 3 is a front elevation view of the roof rack.

FIG. 4 is a cross section taken at lines 4—4 on FIG. 3.

FIG. 5 is a side elevation view of the roof rack having a cargo support in an inclined position.

DESCRIPTION OF THE PREFERRED EMBODIMENT

Figure 6:
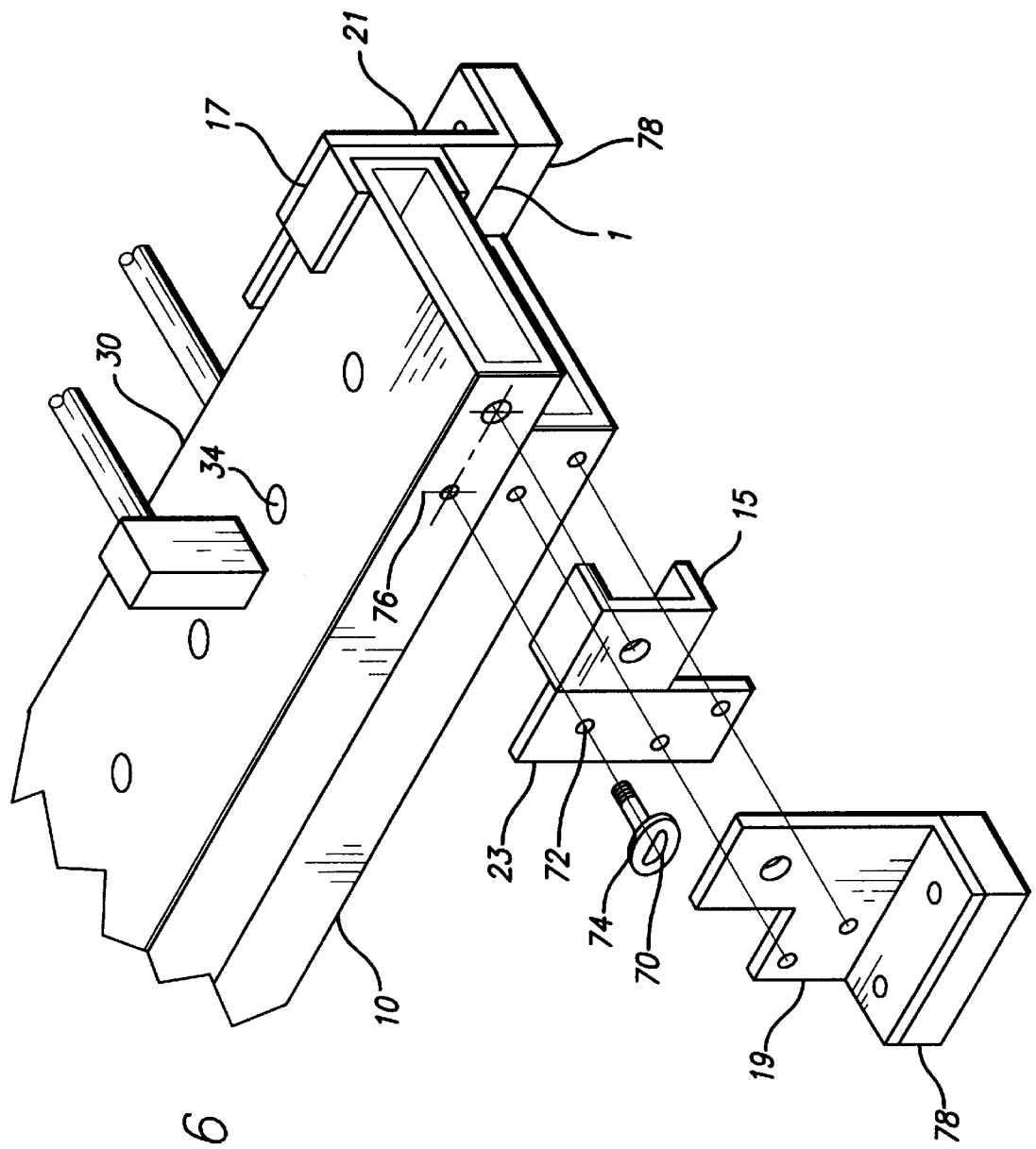
FIG. 6 is an exploded view to an enlarged scale of one end of a portion of the roof rack.

The roof rack is comprised of two spaced units each comprised of a lower stationary support 10, 20 and an upper cargo support 30, 40, the units being mountable atop a vehicle in spaced generally parallel relationship to each other. As best seen in FIGS. 2, 4 and 5, the stationary supports and cargo supports each preferably comprise similarly sized rectangular channels so that the lower surface of the cargo supports 30, 40 can rest upon and slide against the upper surface of the associated stationary support 10, 20. The stationary supports 10, 20 each have an elongated longitudinally extending slot 12 in the upper surface thereof and the upper cargo supports 30, 40 each have an elongated slot 32 of similar length in a lower surface thereof. Since only one of the cargo support units is shown in the drawings other than in FIG. 1, it will be appreciated that the rear cargo support unit is of similar construction to the front cargo support unit, therefore only one unit will be fully described.

Each stationary support 10, 20 is provided with cargo support guide saddles 14, 16; 24, 26 pivotally affixed thereto at or proximate each end thereof. The guide saddles 14, 16; 24, 26 are sized to slideably receive and restrain an associated cargo support 30 therein for longitudinal sliding movement relative to the stationary support 10 and to essentially prevent fore and aft movement of the cargo support 30 which, however, is free translate and pivot in a generally vertically extending plane extending through the associated stationary support 10 or 20.

The guide saddles comprise opposed rectangular channels 15, 17 which are pivotally affixed to an associated stationary support 10 or 20 at oppositely facing vertical sides of the stationary support. The exploded view of FIG. 6 shows the channels 15, 17 which are pivotally affixed to rigid support plates 19, 21 on opposite sides of the stationary support 10. An intermediate lock support plate 23 is also affixed by welding or fasteners not shown to one side of the stationary support 10 and extends upwardly so that a lock 70 may be received in a mounting aperture 72 in the plate 23 so that a longitudinally moveable plunger 74 of the lock may engage an associated aperture 76 in the side wall of a associated cargo support 30 to lock the cargo support in place relative to the stationary support 10 when desired.

The channels 15, 17 are free to pivot around a horizontal mounting axis so that the cargo support 30, when positioned between the faxing channels 15, 17 can be pulled therethrough to free the other end of the cargo support 30 from the associated guide saddle channels at the other end of the stationary support 10 so that the cargo support 30 can be pivotally moved in a vertical plane as it is pulled through the channels 15, 17 to move the cargo support 30 to one or the other side of the vehicle.

Connecting links 50, 60 extend through each of the associated slots in the upper surfaces of the stationary supports 10, 20 and lower surface of the associated cargo support 30, 40. The links have upper and lower retainers 52, 54 attached thereto at or near each end of the link, the retainers being respectively engageable with the associated inner surfaces of the rectangular cargo supports and stationary supports to prevent the links from being disengaged from the slots during operation of the roof rack. The links 50, 60 and associated slots are designed to permit the cargo supports 30, 40 to slide laterally with respect to the stationary supports 10, 20 so that the cargo supports may be longitudinally moved through the guide saddles 14, 16; 24, 26 and pivoted in vertical planes to tip the cargo supports toward either side of a vehicle. The retainers 52, 54 on the opposite ends of the links are preferably of cylindrical configuration having an end-to-end length slightly less then the inner width of the associated channel so that the retainers and links can freely slide in the channels as the links move in the associated slots. As constructed, the cargo supports should be capable of pivoting while being restrained in one or the other of the guide saddles at either end of the associated stationary support 10, 20 so that the cargo supports 30, 40 (with cargo thereon) are capable of pivoting in a vertical plane at an angle of not less then about 20° with respect to the stationary support so that cargo can easily be loaded or unloaded from either side of the vehicle.

Each cargo support 10, 20 preferably includes a series of spaced cargo clamp mounting sites which, in the drawings, are shown to comprise a series of apertures in the upwardly facing surfaces of the cargo supports 30, 40. The cargo supports 30, 40 are thereby adapted to receive various types of cargo support clamps such as for holding bicycles, skis, enclosed cargo containers, etc., at selected positions on the roof rack. Additionally, each of the stationary supports 10, 20 may also have two or more spaced support feet 78 attached on the underside thereof, the support feet 78 having a rubber or other suitable non-slip lower surfaces designed for contacting a vehicle roof without scratching thereof.

Although the configuration of the stationary supports and cargo supports in the drawings is in the form of rectangular channels, other configurations are contemplated including telescoping tubular members or other geometric shapes of complementary cross-section. Optionally, adjustable elongated spacers 80, 90 interconnecting the stationary supports 10, 20 parallel to each other at an selected distance longitudinally of the vehicle are provided to lend stability to the system. It will be appreciated that the elongated spacers 80, 90 are not essential in all instances if the stationary members 10, 20 are designed to be permanently affixed to the vehicle roof instead of being removeably affixed thereto in suitable fashion. Similarly, adjustable elongated spacers 82, 92 interconnecting the cargo supports as shown are provided to lend stability to the structure. Various connection means, not pertinent to the present invention, are available for affixing the stationary supports to a vehicle roof or to rain gutters along side the vehicle as is well known in the art. The components of the roof rack may be fabricated form steel or aluminum stock or of suitable plastic.

Persons skilled in the art will appreciate that various modifications of the preferred embodiment may be made without departing from the teachings herein and that the scope of protection is defined by the claims which follow.

What is claimed is:

1. A vehicle roof rack for loading and unloading cargo to be transported atop a vehicle from either side of the vehicle comprising:

a) a pair of elongated stationary supports mountable atop a vehicle in spaced generally parallel relationship to each other, each stationary support having an elongated slot in an upper surface thereof;

b) a pair of elongated moveable cargo supports respectively mountable on said stationary supports, said cargo supports being longitudinally and pivotally moveable with respect to said stationary supports in vertical planes containing said stationary supports, said cargo supports each having an elongated slot in a lower surface thereof;

c) each stationary support having a cargo support guide saddle pivotally affixed thereto proximate each end thereof, said guide saddles being sized to slideably receive and restrain an associated cargo support; and d) each stationary support and associated cargo support having a connecting link extending through each of the associated ones of said slots, said links having upper and lower retainers proximate the ends of said links, said retainers being respectively engageable with associated ones of said cargo supports and said stationary supports to prevent said links from becoming disengaged from said slots, said links and said slots having length to permit said cargo supports to slide laterally with respect to said stationary supports so that said cargo supports may be longitudinally moved through said guide saddles and pivoted in vertical planes to tip said cargo supports toward either side of a vehicle.

2. The vehicle roof rack of claim 1, further comprising spaced support feet (80) affixed to each said stationary support for spacing said stationary support above a vehicle roof, said feet each having a non-slip surface for contacting a vehicle roof.

3. The vehicle roof rack of claim 1, further comprising adjustable elongated spacers interconnecting said stationary supports parallel to each other at adjustable spacing from each other.

4. The vehicle roof rack of claim 3, further comprising at least one lock proximate one of said guide saddles for connecting each said cargo support to an associated stationary support with said cargo support positioned in each of said guide saddles proximate the ends of the associated stationary support.

5. The vehicle roof rack of claim 1, wherein said stationary supports are rectangular channels.

6. The vehicle roof rack of claim 5, wherein said cargo supports have a lower surface which rests on and slides against an upper surface of an associated stationary support.

7. The vehicle roof rack of claim 6, wherein said cargo supports further include a series of cargo clamp mounting sites spaced along the length of said cargo supports.

8. The vehicle roof rack of claim 7, wherein said clamp mounting sites comprise a series of apertures in an upwardly facing surface of said cargo supports.

9. The vehicle roof rack of claim 6, wherein said guide saddles comprise opposed rectangular channels pivotally affixed to an associated stationary support at oppositely facing vertical sides of said stationary support.

10. The vehicle roof rack of claim 9, wherein said cargo supports are capable of pivoting while restrained in one of said saddles in said plane at an angle of not less than about 20 degrees with respect to said stationary supports.

11. The vehicle roof rack of claim 10, wherein said retainers are of generally cylindrical configuration having a length for sliding in said channels.

* * * * *